US008766987B2

(12) United States Patent
Pirchio

(10) Patent No.: US 8,766,987 B2
(45) Date of Patent: Jul. 1, 2014

(54) METHOD TO ANIMATE ON A COMPUTER SCREEN A VIRTUAL PEN WHICH WRITES AND DRAWS

(76) Inventor: Mario Pirchio, Pisa (IT)

( * ) Notice: Subject to any disclaimer, the term of this patent is extended or adjusted under 35 U.S.C. 154(b) by 839 days.

(21) Appl. No.: 12/672,010

(22) PCT Filed: Aug. 4, 2008

(86) PCT No.: PCT/EP2008/006394
§ 371 (c)(1),
(2), (4) Date: Feb. 17, 2010

(87) PCT Pub. No.: WO2009/018983
PCT Pub. Date: Feb. 12, 2009

(65) Prior Publication Data
US 2010/0182328 A1    Jul. 22, 2010

(30) Foreign Application Priority Data

Aug. 8, 2007  (IT) .............................. PI2007A0093

(51) Int. Cl.
*G06T 13/00* (2011.01)
(52) U.S. Cl.
USPC ........................................................ 345/474
(58) Field of Classification Search
CPC .................................................. G06F 3/04883
USPC ........................................................ 345/474
See application file for complete search history.

(56) References Cited

U.S. PATENT DOCUMENTS

| | | | | |
|---|---|---|---|---|
| 5,237,647 A * | 8/1993 | Roberts et al. | ................ | 345/419 |
| 5,590,247 A * | 12/1996 | Mikuni | ........................ | 358/1.11 |
| 7,310,091 B2 * | 12/2007 | Liu et al. | ........................ | 345/179 |
| 2003/0190074 A1 * | 10/2003 | Loudon et al. | ................ | 382/187 |
| 2004/0148577 A1 * | 7/2004 | Xu et al. | ........................ | 715/530 |
| 2004/0165777 A1 * | 8/2004 | Lossev et al. | ................ | 382/187 |
| 2006/0276234 A1 | 12/2006 | Kang et al. | | |
| 2009/0003705 A1 * | 1/2009 | Zou et al. | ...................... | 382/187 |

OTHER PUBLICATIONS

Guerfali et al. (The Delta LogNormal Theory for the Generation and Modeling of Cursive Characters, IEEE, 1995).*
Do-Hoon Lee et al "A New Synthesizing Method for Handwriting Korean Scripts", International Journal of Pattern Recognition etc., Feb. 2, 1998, pp. 45-61.

(Continued)

*Primary Examiner* — Maurice L McDowell, Jr.
*Assistant Examiner* — Kyle Zhai
(74) *Attorney, Agent, or Firm* — Ladas & Parry LLP

(57) ABSTRACT

A method to animate on a computer screen a virtual pen which writes and draws on a virtual blackboard in order to simulate a real pen writing on a real blackboard. Graphemes and drawings (50) are created by specifying a subset of knot points (106, 107, 108, 109) from the set of points forming the lines (50) to draw. All the attributes concerning the knot points, as coordinates (201), pauses, speed, thickness, etc., are stored in a file. Subsequently the user types on the keyboard the word to write or selects from a list the drawing to draw. At this point all the attributes of the knot points of the graphemes to write or of the drawing to draw are retrieved from the file and interpolated, and the data obtained are used to animate a virtual pen in such a way it writes and draws looking like a real pen, pausing at the sharp angles, detaching from and landing on the writing surface of the virtual blackboard, varying the thickness and the speed of drawing, using block letters or joined-up writing.

15 Claims, 12 Drawing Sheets

(56) References Cited

OTHER PUBLICATIONS

Lin et al "Style-preserving English Handwriting Synthesis", Pattern Recognition, Elsevier, GB, Mar. 30, 2007, pp. 2097-2109.

Jue Wang et al "Combining Shape and Physical Models for Online Cursive Handwriting Synthesis", Internal Journal of Document Analysis and Recognition (IJDAR), Sep. 2005, pp. 219-227.

* cited by examiner

FIG. 11
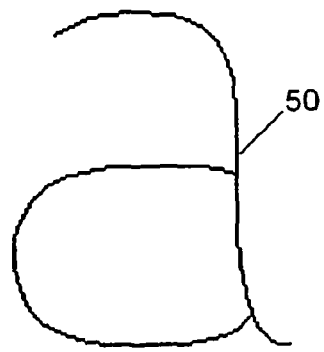
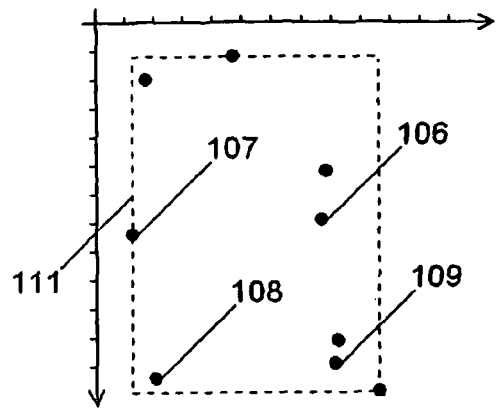
FIG. 12
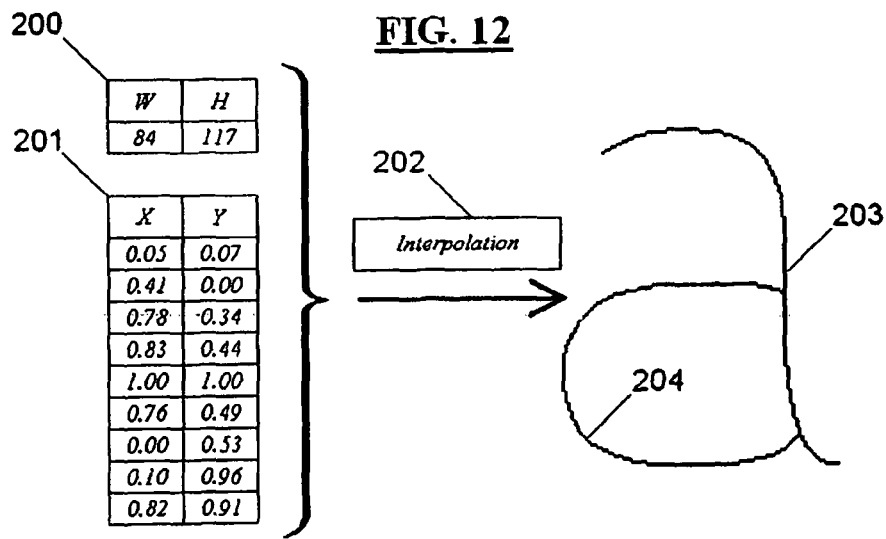
FIG. 13
| | 205 | 206 | 207 | 208 | 209 |
|---|---|---|---|---|---|
| | *interp.* | *pause* | *u/d* | *speed* | *thick.* |
| | spline | 0 | down | 80 % | 100 % |
| | ... | 0 | down | 100 % | 200 % |
| | ... | 0 | down | 150 % | 400 % |
| | ... | 0 | down | 100 % | 200 % |
| | ... | 0 | up | 80 % | 100 % |
| | spline | 0 | down | 100 % | 100 % |
| | ... | 0 | down | 100 % | 200 % |
| | ... | 0 | down | 100 % | 200 % |
| | ... | 0 | up | 100 % | 100 % |

| L | T | W | H |
|---|---|---|---|
| 0.30 | 0.36 | 0.45 | 0.31 |

METHOD TO ANIMATE ON A COMPUTER SCREEN A VIRTUAL PEN WHICH WRITES AND DRAWS

FIELD OF THE INVENTION

This invention is aimed mostly to teachers and students, and consists in a method to animate on a computer screen a virtual pen which writes and draws in such a way it looks like a real pen used by a teacher writing on a real blackboard.

DESCRIPTION OF THE TECHNICAL PROBLEM

Two widely used tools in the classroom are the pen and the blackboard. On the blackboard teachers write sentences, draw geometrical shapes, write chemical formulas, and so on.

In the last years the e-learning field has progressed very much, and there are many available software products to create multimedial presentations which show students texts and pictures.

However, despite this technological progress, it is still very difficult even for an expert user to present on the computer screen a virtual pen which writes and draws in such a way it is as appealing and realistic as the real writing of a teacher is.

For example, to write the grapheme "a" (FIGS. 1-5), labelled as 50, the teacher usually starts from point 51, writes the line from this point until point 52, lifts the pen and moves it to point 53, writes the line until point 54, and ends lifting the pen. While lifting and moving from point 52 to point 53, the pen follows a trajectory 56 which is not straight, but which depends on the writing speed, on the shape of the last line drawn, and on the shape of the next line to draw. Furthermore, the central part of the first line, between points 51 and 52, is straight, and then this central part will be usually written faster 57 than the initial and final parts of that line. And if we are writing with a fountain-pen, the thickness of this central part will be wider 58.

And if the teacher wants to draw a rectangle 60 (FIGS. 6-7) without detaching the pen from the writing surface, starting for instance from point 61 and drawing until points 62, 63 and 64, then when the pen reaches point 62 he has to stop for a while before starting to draw the vertical line towards point 63, otherwise, due to the sudden change in direction, it will be impossible for him to draw a right angle, and he will draw a rounded angle instead. The same occurs for points 63 and 64.

Thus, in order that a software can animate on the screen a virtual pen to write grapheme 50 or to draw rectangle 60 so that it appears as smooth and realistic as a real pen, several technical problems have to be overcome, as listed below.

First. The lines forming the grapheme or the drawing have not to be presented on the screen in a single frame, but have to be drawn on the screen one after the other, following a pre-established order.

Second. The virtual pen has to be able to vary the drawing speed. For example, the drawing speed has to decrease when the line to be drawn becomes curved and to increase when it becomes straight.

Third. The virtual pen has to be able to vary the thickness of the line, as it happens for instance by writing with a real fountain-pen.

Fourth. When the writing direction changes sharply, as for example at the angles of the grapheme "Z" or of a rectangle, the virtual pen has to stop for a while.

Fifth. When the virtual pen has to detach from the writing surface and to move without writing, as for instance during the moving between two consecutive graphemes of the same word or from the end of a word and the beginning of the next word, the trajectory of the pen has to be calculated.

Sixth. The image of the virtual pen has to move on the computer screen in such a way its tip is always very close to the last drawn pixel, as it happens with a real pen, and the user has to be able to select another image during any moment of the writing.

Seventh. If the virtual pen has to write the graphemes of a word using joined-up writing, then the lines joining the graphemes have to be set.

SUMMARY OF THE INVENTION

The object of the present invention is to provide a method that allows even an inexpert user to animate on a computer screen a virtual pen which, for example, writes the words typed on the keyboard by the user itself or more in general draws a drawing in such a way it appears to be as realistic as a real pen is, by solving the above-mentioned problems.

This object is accomplished by the method according to the invention, as defined by claim 1. The dependent claims define advantageous aspects of the invention.

BRIEF DESCRIPTION OF THE DRAWINGS

Further characteristics and the advantages of the present invention will be made clearer with the following description of an exemplary embodiment thereof, exemplifying but not limitative, with reference to the attached drawings wherein:

FIGS. 8-15 show how the exemplary grapheme "a" of FIGS. 1-5 is created according to the invention.

DESCRIPTION OF A PREFERRED EMBODIMENT

Figure 1:
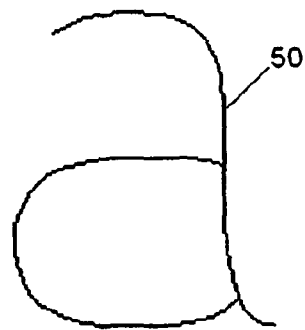
FIGS. 1-5 show the steps and the problems of the exemplifying example of manually writing a grapheme "a"
Figure 2:
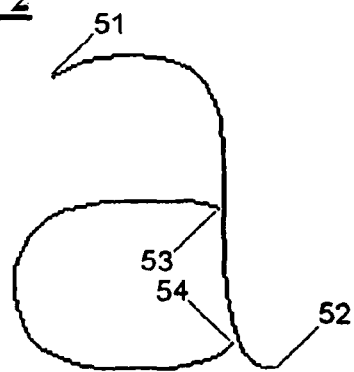
Figure 3:
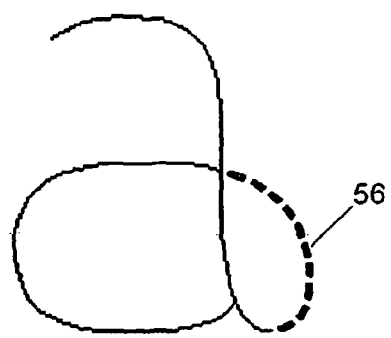
Figure 4:
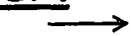
Figure 5:
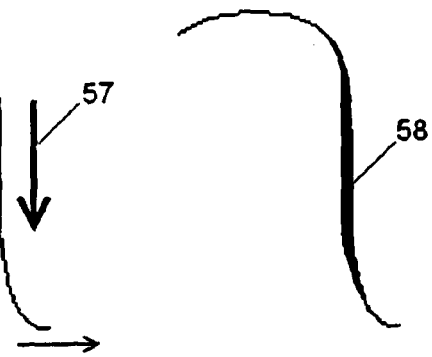
Figure 6:
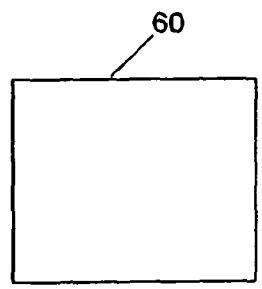
FIGS. 6-7 show the problems of the pauses at the sharp angles while drawing a rectangle.
Figure 7:
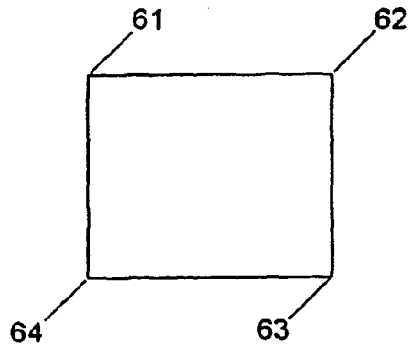

The method can be split into two phases, called phase 1 and phase 2.

During phase 1 graphemes and drawings are created and stored in a file. Each grapheme or drawing is created by specifying an ordered subset of knot points from the set of points forming the lines to draw. For each knot point some attributes will be set. These attributes contain all the information necessary to allow the virtual pen to write the grapheme or to draw the drawing, that is: the coordinates, the kind of interpolation and relative weights, the possible pauses, the knot points between which the pen has to detach from the writing surface and to move without writing, the writing speed, and the thickness.

During phase 2 all the information stored in the file during phase 1 is retrieved and used to animate on the computer screen a virtual pen.

Phase 1 is performed by using an application called "Maker".

Phase 2 is performed by using an application called "Player".

Phase 1. Creation of Graphemes and Drawings and Their Storage in a File (FIGS. 8-15).

Graphemes are created by means of the Maker. The user can interact with the Maker by using just the mouse or the keyboard, without the need of any graphics tablet or similar tools.

Phase 1. Step A. Creating the Knot Points of a Grapheme or Drawing, and Setting Their Attributes (FIGS. 8-13).

For instance grapheme "a" (labelled as 50) is created.

Figure 8:
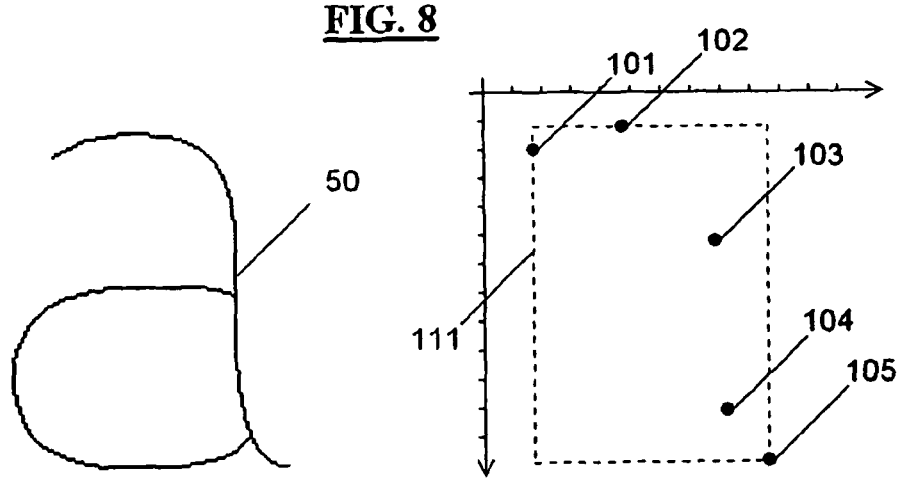
Figure 9:
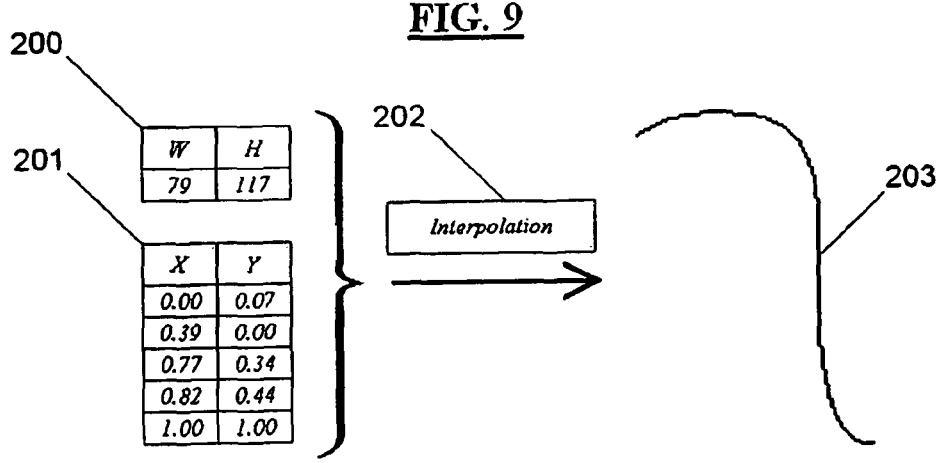
Figure 10:
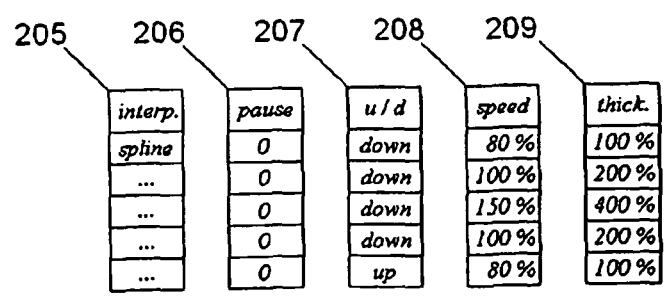
Figures 14, 15:
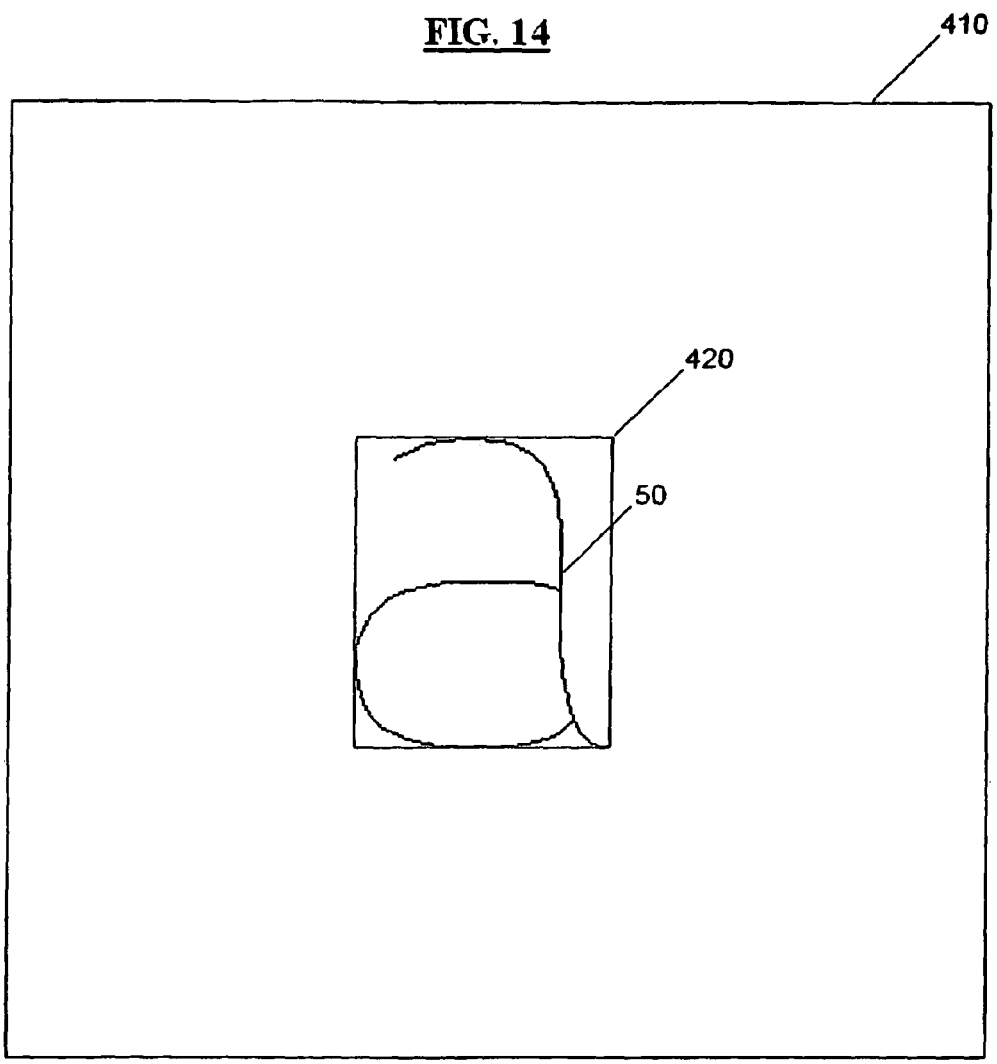

Reference is made to FIGS. 8-10 first. The user clicks the mouse five times to create knot points 101, 102, 103, 104 and 105, in this order. After each click the Maker stores in buffer 200 the width W and the height H of the smallest rectangle 111 containing all the clicked knot points, stores in buffer 201 their coordinates by normalizing them between 0 and 1, interpolates (202) those coordinates (by using known algorithms such as splines and so on) by normalizing them to the rectangle specified in buffer 200, and show the interpolated line 203, that is the actual line the virtual pen will draw in the Player.

The kind of interpolation to be used and its parameters and weights are selected by the user, and are stored by the Maker in buffer 205.

The Maker colours, for example, knot point 101 green and knot point 105 red, to signal that line 203 will be drawn (by the virtual pen of the Player) starting from knot point 101 and ending on knot point 105, according to the order which the knot points have been clicked by the user. The user, however, can cause the Maker to reverse the order of the knot points stored in buffer 201, so that the Maker will colour, for example, knot point 101 red and knot point 105 green, to signal that line 203 will be drawn (by the virtual pen of the Player) starting from knot point 105 and ending on knot point 101. The user can also shift every single knot point, can eliminate every single knot point, and can insert new knot points between the old ones in such a way the shape of line 203 achieves a desired shape.

For each knot point the user specifies for how long the virtual pen has to possibly pause when it reaches that point while generating the drawing, and the Maker eventually stores these data in buffer 206. The line 203 does not contain any sharp angle, and then the virtual pen has to draw it without stopping. Thus the pauses of knot points 101, 102, 103, 104 and 105 will be set to 0.

For each clicked knot point the user also specifies if the virtual pen has to detach from the writing surface or not. For line 203 the virtual pen has to detach from the writing surface only when the end of the line has been reached. Thus, the user sets the pen status to "down" for knot point 101, 102, 103 and 104, and to "up" for knot point 105. The Maker stores these data in buffer 207.

It is important to note that each grapheme or drawing has to be subdivided into a same number of lines as the number of strokes a real pen makes (without lifting or pausing) when it writes that grapheme or drawing. Then, the knot points with a duration pause greater than 0 or with the pen status "up" will constitute the end of a line. Therefore, knot point 105 will constitute the end of line 203.

For each clicked knot point the user also specifies the nominal writing speed downstream of the point. Note that the actual writing speed will be calculated by the Player just in time, taking into account the value set by the user during the multimedia presentation. In the Maker the user has to specify only if the line has to be drawn at the same speed or if some parts of it have to be drawn slower or faster. If for instance the user wants the virtual pen to draw the central straight part of line 203 faster than its initial and final parts, then the user sets the speed of knot points 101, 102, 103, 104 and 105 for example 80%, 100%, 150%, 100% and 80%. The Maker then stores these data in buffer 208.

For each clicked knot point the user also specifies the writing thickness downstream of the point. If for instance the user wants the virtual pen to draw the central straight part of line 203 thicker than its initial and final parts, then the thickness of knot points 101, 102, 103, 104 and 105 is set, for example 100%, 200%, 400%, 200% and 100%. The Maker stores these data in buffer 209.

Reference is now made to FIGS. 11-13. The user repeats the previous steps for the next line of the grapheme, clicking the mouse four times on knot points 106, 107, 108 and 109, in this order. After each click the Maker stores in buffer 200 the width W and the height H of the smallest rectangle 111 containing all the clicked knot drawing, the buffers 201, 205, 206, 207, 208 and 209 containing the data of the attributes of the knot points.

Phase 2. The Virtual Pen Writes and Draws (FIGS. 16-28).

Writing and drawing are performed by the virtual pen in the Player. Let us describe how this is done for graphemes first, and for drawings next.

Figure 16:
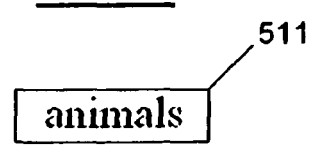
FIGS. 16-17 show the step of text typing and of setting relative parameters.
Figure 17:
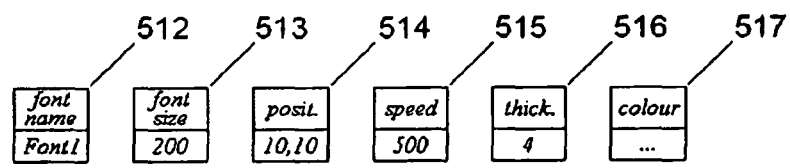

Phase 2. Step A. Setting the Text to be Written and Relative Parameters (FIGS. 16-17).

The user, by using for instance the keyboard, inputs the text which the virtual pen has to write. For example, the first word of the text is "animals" 511. The user specifies the font of the text as well, for example selecting a font contained in the file "Font1" 512.

The user also specifies the fontsize of the text, the position on the screen of the first grapheme of the text, the writing speed, the thickness of the line and the colour. For example, a value 200 for the fontsize, coordinates (10,10) for the position on the screen, a value of 500 pixels-per-second for the speed, a value of 4 pixels for the thickness, and black for the colour. The Player stores these values in buffers 513, 514, 515, 516 and 517, respectively.

The user can now command the Player to start animating the virtual pen for writing.

Figure 18:
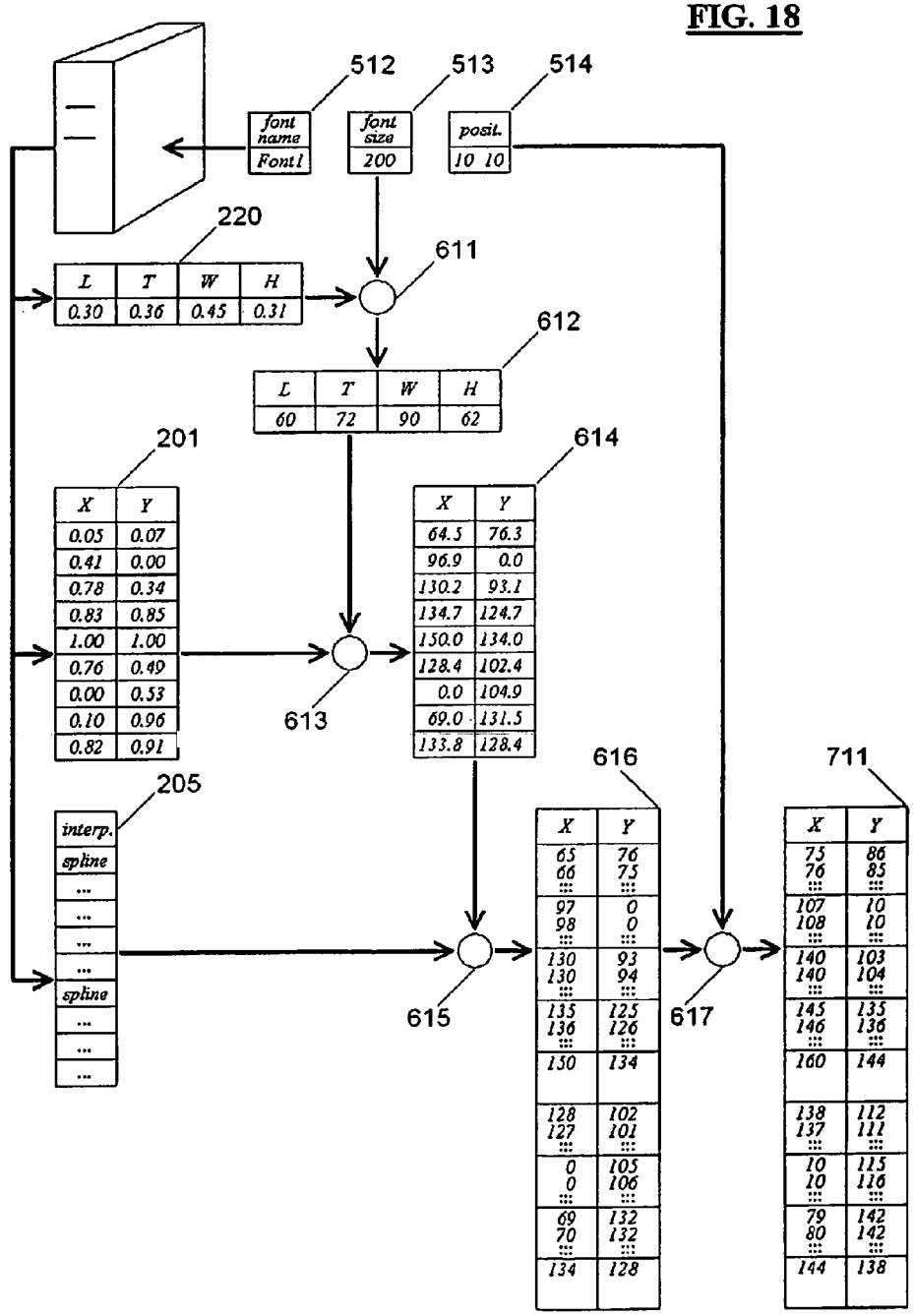
FIG. 18 shows the step of recovering information about the coordinates of the graphemes to be written and the kind of interpolation to be used, and the transformation of these coordinates into screen coordinates.
Figure 19:
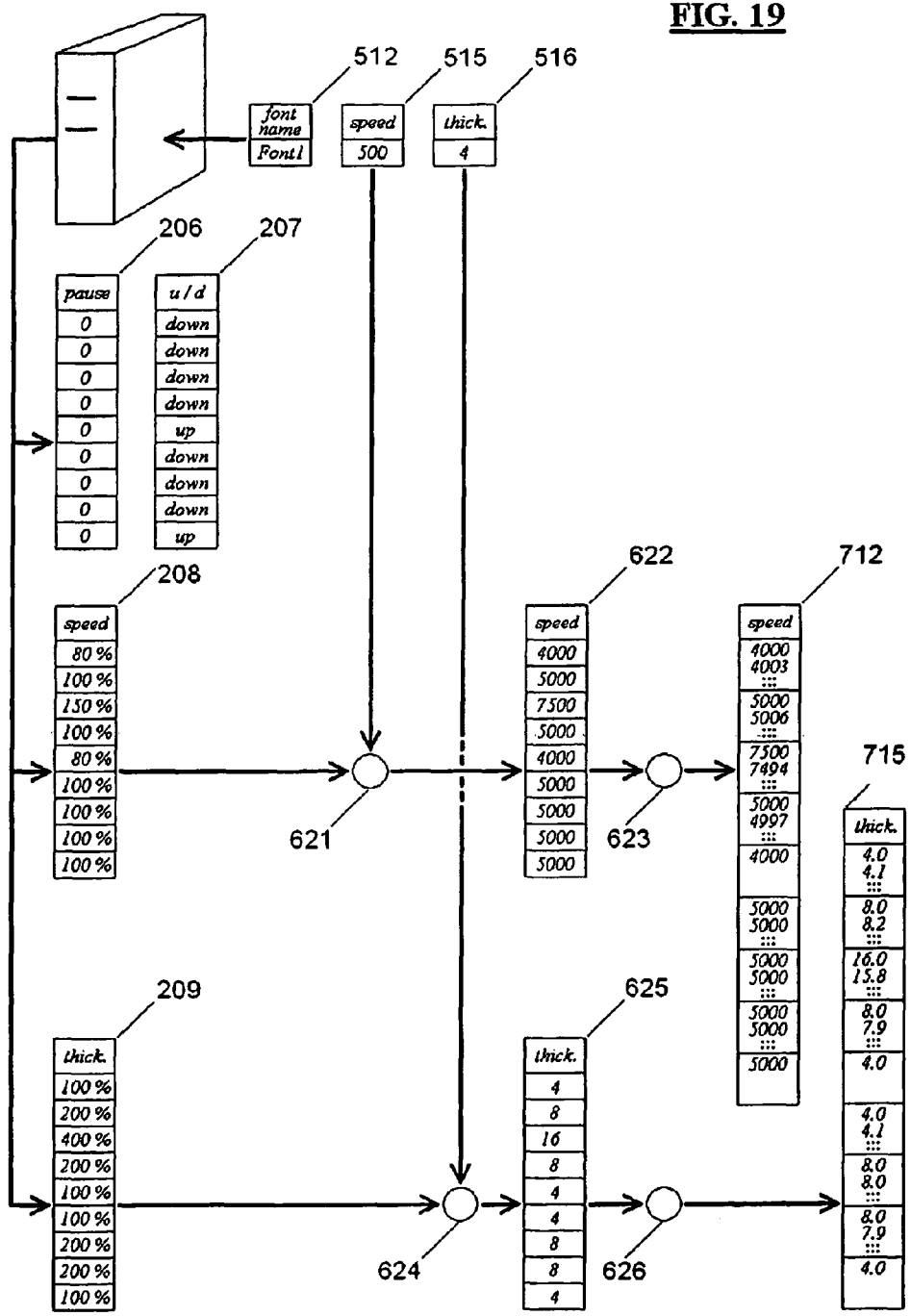
FIG. 19 shows the step of recovering information about the pauses, the pen status (up/down), the speed and the thickness with which the virtual pen has to write.

Phase 2. Step B. Reading from File the Data Relative to the First Grapheme to be Written (FIGS. 18-19).

The first grapheme to write is the grapheme "a". So the Player reads from the file specified by buffer 512, that is from file "Font1", the data to be used to write that grapheme, that is its rectangle inside the cell (buffer 220) and the attributes of its knot points. The attributes of each knot point are the coordinates (buffer 201), the data relative to the kind of interpolation to be used (buffer 205), the duration of the possible pause (buffer 206), the pen status (buffer 207), the writing speed downstream of the knot point (buffer 208) and the thickness of the line downstream of the knot point (buffer 209).

Phase 2. Step C. Calculating the Coordinates of the First Grapheme to be Written (FIGS. 18-19).

The Player reads buffers 206 and 207 to calculate how many strokes will be needed to write the first grapheme, that is the grapheme "a". Every knot point whose pause is greater than 0, or whose pen status is "up", is considered as the end of a stroke. Thus, the first stroke of grapheme "a" will include the first 5 knot points, and the second stroke will include the last 4 knot points.

The Player (FIG. 18) uses the fontsize value (513) to convert (operation 611) into screen coordinates rectangle 220 containing the grapheme inside the cell, stores them in buffer 612, and uses them to convert (operation 613) in screen coordinates the coordinates 201 of the knot points, and store them in buffer 614. The Player then uses the data stored in buffer 205 to interpolate (operation 615) the coordinates 614 of the knot points forming the first stroke and the second stroke, separately, and stores the calculated coordinates in buffer 616. The Player, at last, uses the data of buffer 514 to convert (operation 617) the coordinates 616, thus obtaining the actual coordinates of the pixels to be drawn, and stores them in buffer 711.

Phase 2. Step D. Calculating the Speed and Thickness with which the First Grapheme has to be Written (FIG. 19).

The Player, by using the value of the speed (buffer 515), transforms 621 in pixels-per-second the writing speed 208 downstream of each knot point, stores in buffer 622 the calculated values, interpolates them (spline interpolation) 623, and stores the result in buffer 712.

The The Player, by using the value of the thickness (buffer 516), transforms 624 into pixels the thickness 209 of the line downstream each knot point, stores in buffer 625 the calculated values, interpolates them (spline interpolation) 626, and stores the result in buffer 715.

Figure 20:
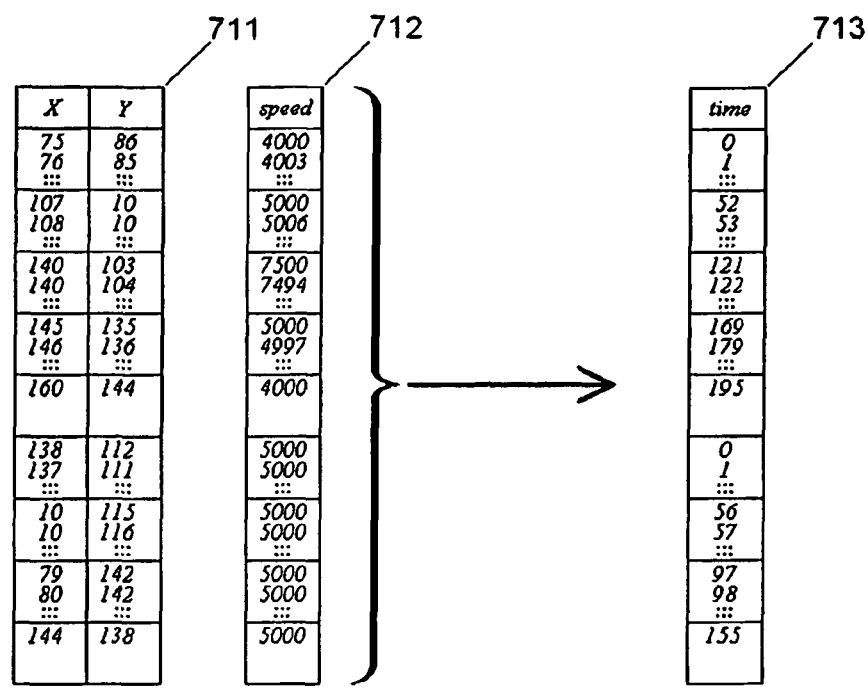
FIG. 20 shows the step of the creation of the buffers containing the moments at which the drawing of each pixel has to be done.

Phase 2. Step E. Calculating the Time Each Pixel of the First Grapheme has to be Written at (FIG. 20).

The Player uses the values of buffers 711 and 712 to calculate the time each pixel has to be written at, and stores them in buffer 713.

Figure 21:
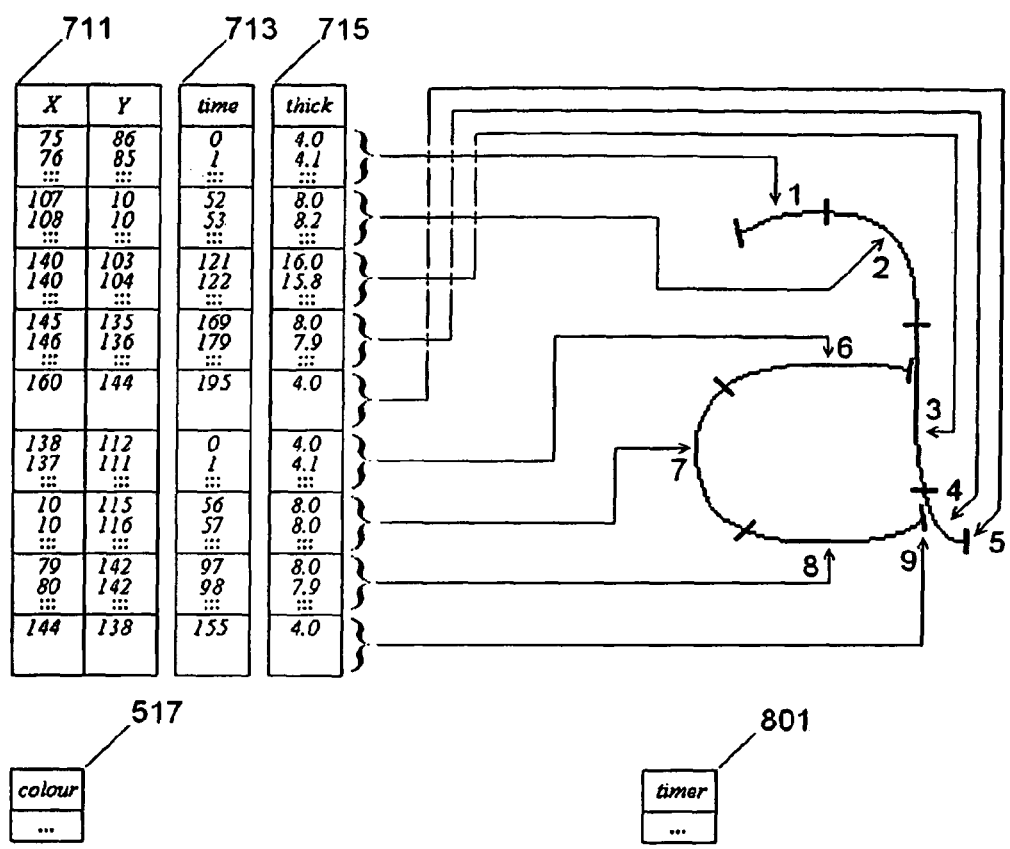
FIG. 21 shows the steps of the drawing of the exemplary grapheme "a" of FIGS. 1-5 according to the coordinates, the speed and the thickness previously calculated.
Figure 22:
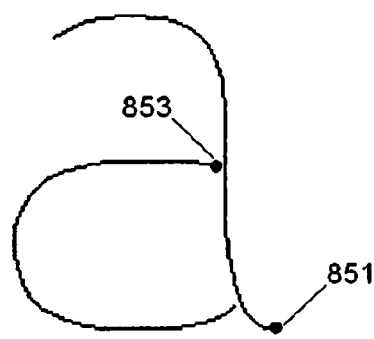
FIGS. 22-25 show the trajectory which the virtual pen, when writing the exemplary grapheme "a" of FIGS. 1-5, has to follow to detach from the writing surface and move between the first stroke and the second one.
Figure 23:
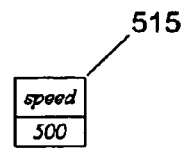
Figure 24:
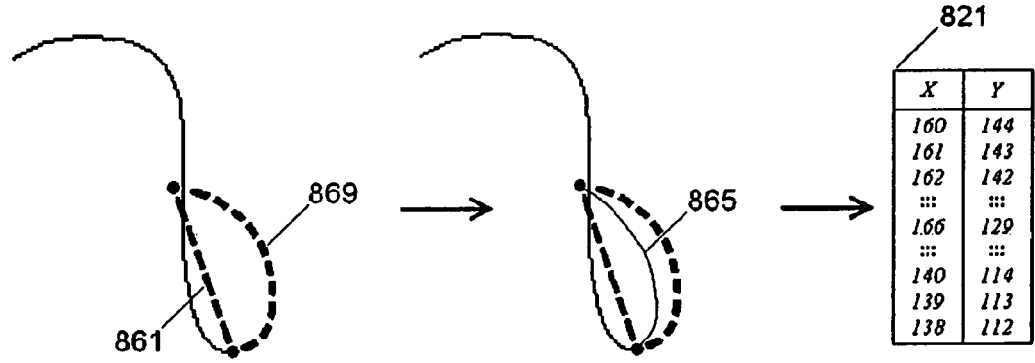
Figure 25:
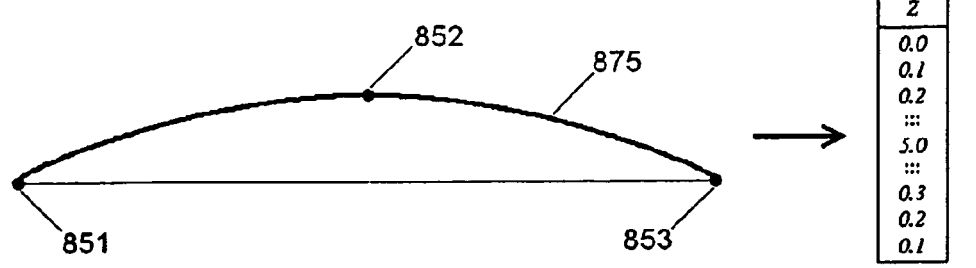

Phase 2. Step F. Writing the First Line of the First Grapheme (FIG. 21).

The Player can now start the virtual pen's animation.

The Player shows on the computer screen the image of the virtual pen, by locating it so that its tip is exactly on the first pixel to the right of the first pixel to be drawn, that is the first item of buffer 711.

The Player can now start writing the first line of the grapheme. The information on what to draw, and on how to draw, is contained in buffers 711, 713 and 715. In fact, the coordinates of the pixels to draw are stored in buffer 711, and the speed and the thickness with which to draw them are stored in buffers 713 and 715, respectively.

The Player causes timer 801 to start, and immediately after points onto the first pixel of buffer 711 and starts drawing with the thickness indicated by the first item of buffer 713 and with the colour of buffer 517 (FIGS. 17 and 21).

After that, the Player reads the actual time of timer 801, looks for the first item of buffer 713 whose value is greater than that actual time, and draws all the pixels preceding such an item and not yet drawn.

Then the Player reads again the actual time of timer 801, and so on, until all the parts 1, 2, 3, 4 and 5 of the first line are drawn.

At this point the writing of the first line of the first grapheme is finished.

It should be noted that the actual number of loops necessary to complete this steps depends on the value of speed set by the user (FIG. 17, buffer 515) and on how fast is the used computer. If the speed value is very low and/or the computer is very fast, the line is drawn in a number of loops equal to the number of pixels composing the line itself.

Note also that during the drawing the user can change the drawing speed (FIG. 17, buffer 515) or the virtual pen's image, and that in this case the Player will use the new settings in the next loop, according to how explained in WO2006054126.

Phase 2. Step G. The Virtual Pen Detaches from the Writing Surface and Moves to the Beginning of the Next Line (FIGS. 22-25).

The Player has now to detach the virtual pen from the writing surface and to move it from pixel 851 to pixel 853, that is to the first pixel of the next line to draw. To do this the Player has to calculate the three-dimensional trajectory that the virtual pen's tip has to follow in order to detach from the writing surface, move, and to land on the writing surface in a realistic way.

The Player calculates twice the projection of that trajectory on the writing surface (FIG. 24), once by using the lowest speed (for instance 80 pixels-per-second) and in the other case by using the fastest speed (for instance 2000 pixels-per-second). When the calculation is done by using the slowest speed, the straight line 861 is obtained. In fact, when the speed is very slow, the trajectory is not affected by the shape of the line just drawn. On the contrary, when the calculation is done by using the fastest speed, the last pixels of the line just drawn and the first knot points of the next line to draw have to be interpolated (cubic spline) and the curve 869 is obtained. In fact, when the speed is very fast, the trajectory is affected very much by the shape of the last part of the line just drawn and by the shape of the first part of next line to draw.

Then the Player, by taking into account the actual speed (buffer 515, FIGS. 17 and 23) set by the user, calculates the curve 865 (FIG. 24) that is intermediate between line 861 and curve 869, and stores the result in buffer 821.

After that the Player calculates the projection 875 (FIG. 25) of the trajectory on the z-plane by estimating the parabola through the last drawn pixel 851, the next pixel to draw 853, and the highest lifting point 852 of the virtual pen's tip. In the example shown (FIG. 25) point 852 is assumed to be equidistant from points 851 and 853. If the distance of the user from the computer screen is 50 cm, then the highest lifting point 852 is assumed to be 5 cm from the writing surface for a distance of 1000 pixels between points 851 and 853. The Player stores the result in buffer 822.

The Player can now start the animation, to detach the virtual pen from the writing surface, to move it and to lower it again onto the writing surface. Values in buffer 821 will be used to locate the pen image on the writing surface. Values in buffer 822 will be used to rotate, translate and scale the pen image during the lifting, moving and lowering. A timer is used to time all the process, similarly to what done in step F of phase 2 (FIG. 21, timer 801).

Phase 2. Step H. Writing the Next Lines of the First Grapheme (FIG. 21).

Steps F e G will be repeated until all the lines of the first grapheme are written. In the example shown the virtual pen writes the line containing the pieces 6, 7, 8 and 9 (FIG. 21).

Phase 2. Step I. Writing the Next Graphemes of the First Word.

Steps from B to H are repeated until all the graphemes of the first word are written.

If a proportional font writing is wanted, then the abscissa of the first pixel of the second grapheme will be set to the sum of the value in buffer 514 (FIG. 18), plus the width in pixel of the last drawn grapheme (buffer 612, FIG. 18), plus a fixed spacing value (given by the constant C1 times the fontsize (buffer 513, FIG. 18)), plus the thickness (buffer 516, FIG. 19). Usually constant C1 is set to 0.12, but different values can be set by the user, stored in the file containing the graphemes, and read during step B of phase 2.

Phase 2. Step J. Writing the Next Words.

Steps from B to H will be repeated until all the words of the text will be written.

The spacing between consecutive words will be calculated similarly to how done in step I. However a constant C2 (instead of C1) is used. Usually constant C2 is set to 0.30. The line spacing is calculated by summing to the ordinate of the last written row the height of the grapheme cell multiplied by the fontsize (buffer 513, FIG. 18) divided by a constant C3. Usually constant C3 is set to 0.55. Different values of the constants C2 and C3 can be set by the user, stored in the file containing the graphemes, and read during step B of phase 2.

Procedure to Draw the Drawings

Drawings are drawn in a way similar to the graphemes, but more easily, because steps I and J can be skipped, and step B needs just the selection of the drawing to draw, for instance by selecting it from a list.

Figure 26:
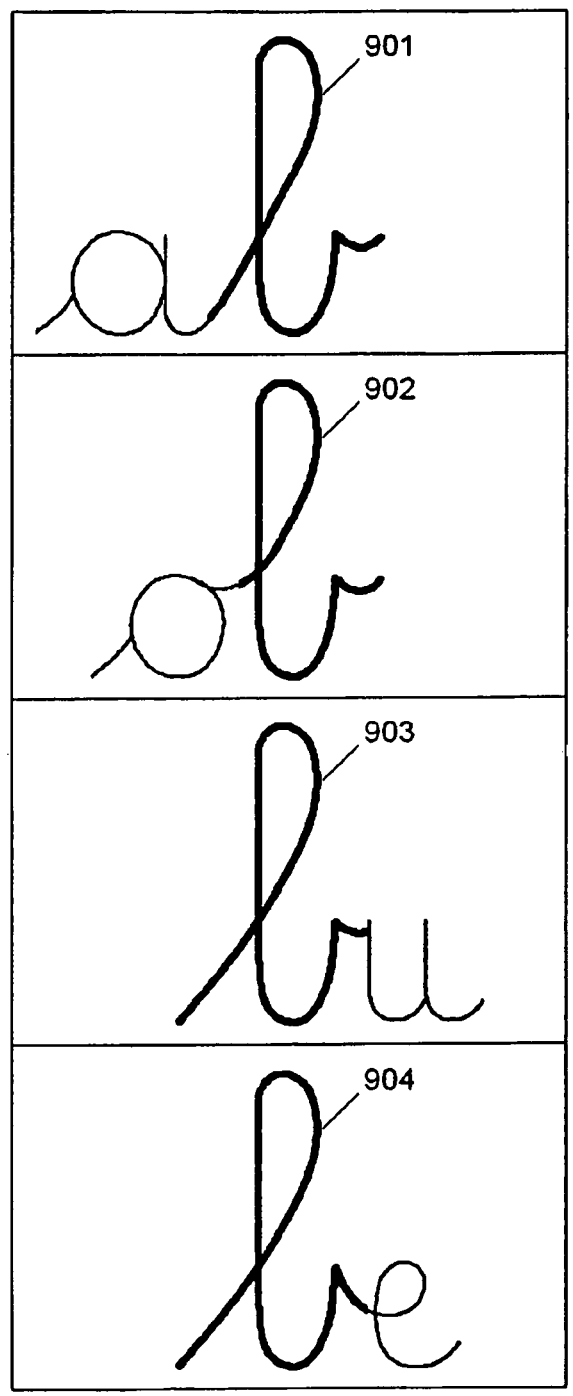
FIGS. 26-28 show the problems of using joined-up writing and how every single grapheme has to be modified to solve them.
Figure 27:
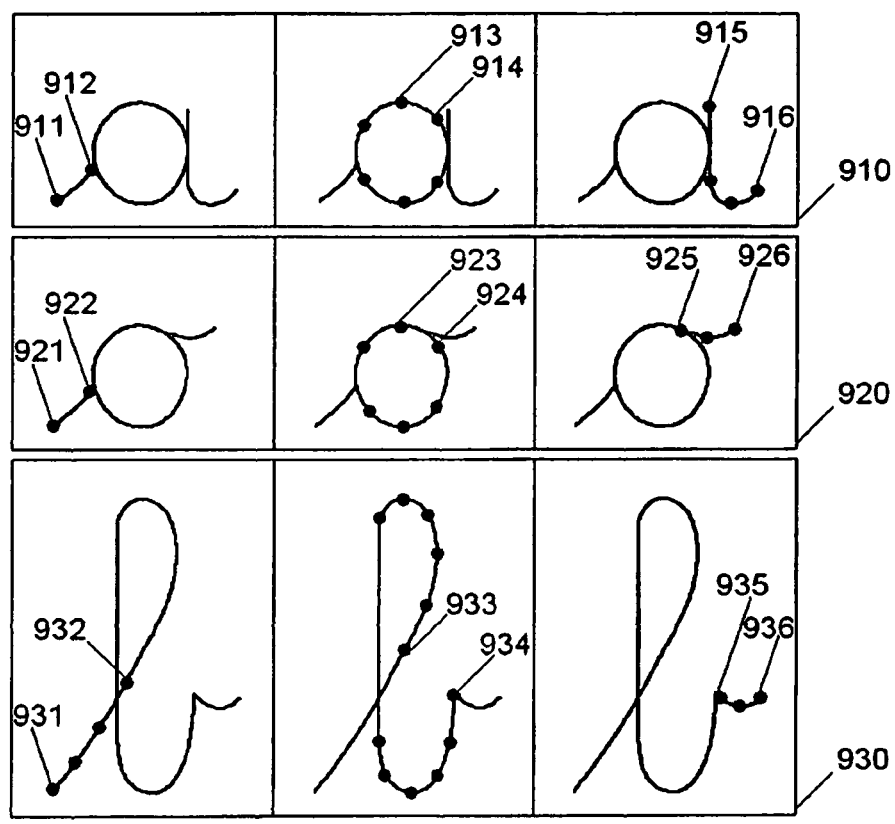
Figure 28:
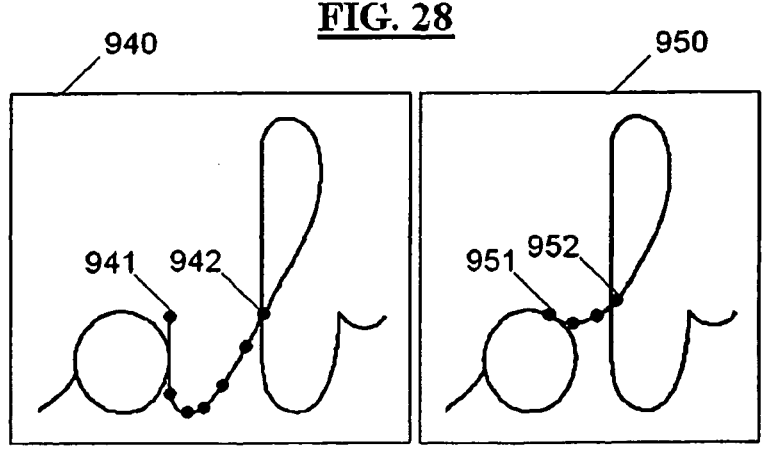

Joined-Up Writing (FIGS. 26-28)

When a teacher writes a word using joined-up writing, every single grapheme has to be joined to the preceding and following graphemes. Thus, the shape of a given grapheme is not constant, but changes according to the preceding and following graphemes. The shapes of graphemes "b" 901, 902, 903 and 904 (FIG. 26), for instance, are different from each other because they are preceded or followed by different graphemes, and then the lines joining each grapheme "b" to these graphemes are possibly different.

So, to allow the virtual pen to write a text using joined-up writing, various shapes have to be assigned to every single grapheme. This will be done by subdividing every single grapheme in three parts: an initial part, a central part and a final part. The shapes of the initial and final parts will be affected by the preceding and following grapheme, respectively, while the shape of the central part is kept constant.

To do this, some modifications have to be made to phases 1 and 2 described above.

First, after having stored the graphemes in a file (step C of phase 1), a new step is required to allow the user to subdivide, by means of the Maker, all the knot points of each grapheme in three subsets: a subset of initial knot points, a subset of central knot points, and a subset of final knot points. In the grapheme "a" (910) (FIG. 27), for instance, knot points 911 to 912, 913 to 914, and 915 to 916 constitute the initial, central and final subset, respectively. Similarly, in the grapheme "o" (920) knot points 921 to 922, 923 to 924, and 925 to 926 constitute the initial, central and final subset, respectively, and in the grapheme "b" (930) knot points 931 to 932, 933 to 934, and 935 to 936 constitute the initial, central and final subset, respectively.

Then the user, for each couple of graphemes, has to create the knot points of the line joining the central part of the first grapheme to the central part of the second one, modifying the final subset of knot points of the first grapheme and the initial subset of the second grapheme. This is done by means of the Maker, in a way similar to step A of phase 1. For the couple of graphemes "ab" 940 (FIG. 28), for instance, knot points 941 to 942 are created, and for the couple of graphemes "ob" 950 knot points 951 to 952 are created.

All these data are then stored in the same file where the single graphemes have been initially stored.

Phase 2 has to be slightly modified as well, just to allow the reading not of single graphemes, but of single couples of graphemes. For example, to write the word "animals" 511 (FIG. 16) using joined-up writing, the Player can proceed in the following way. First, steps B to H are executed, but confining to the initial and central parts of the first grapheme of the word. Second, steps B to H are repeated to write the line joining the first grapheme to the second grapheme of the word. Third, steps B to H are repeated to write the central part of the second grapheme of the word. Fourth, steps B to H are repeated to write the line joining the second grapheme to the third grapheme of the word. And so on, until, at the end of the word, steps B to H are repeated to write the central and final parts of the last grapheme of the word. Obviously, when graphemes are stored in a file (step C of phase 1) a buffer has to be set to specify if the graphemes have to be joined up or not, and this buffer will be then read by the Player.

The present method solves all the technical problems described above. In particular even an inexpert user can create graphemes and drawings, and can specify the order of writing of the lines composing those graphemes and drawings, the nominal speed and thickness of those lines, and the possible pauses at the angles, so solving the first four and the sixth technical problems.

Furthermore, this method allows the virtual pen to detach from the writing surface, to move along a trajectory calculated just in time, and to land on the writing surface, like a real pen does when it has to move between consecutive strokes of a same grapheme, consecutive graphemes of a same word, and consecutive words of a same text, so solving the fifth technical problem.

Last, this method allows the virtual pen to write a text using joined-up writing, so solving the seventh and final technical problem.

Thus, by using this method it is possible even for an inexpert user to animate on a computer screen a virtual pen which writes and draws in a way it looks like a real pen used by a teacher writing on a real blackboard.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications has to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A method to animate on a screen a virtual pen, said method configured for generating on said screen an output consisting of said virtual pen writing a drawing or grapheme by means of lines, in such a way that said lines are written slowly on said screen by said virtual pen in order to mimic the way a teacher would write said drawing or grapheme on a blackboard; comprising the steps of:
    creating the drawing/grapheme as a sequence of line portions separated by knot points, each knot point having at least a pair of coordinates;
    attributing to each knot point a parameter selected among: kind of interpolation and relative weights, virtual pen status up/down from the writing surface, duration of a possible pause, writing speed downstream of the knot point, thickness of the line downstream of the knot point, or a combination thereof;

storing said knot points and said parameters attributed to each knot point for each drawing/grapheme to be written;

generating from said stored knot points and parameters an output comprising a determined trajectory that passes through all said knot points;

said determined trajectory being formed by visible line portions and invisible line portions between said knot points;

said determined trajectory taking into account the values of said parameters of said knot points and/or the values of said parameters interpolated between said knot points;

causing said virtual pen to write slowly said determined trajectory to mimic the way a teacher would write said trajectory on a blackboard.

2. Method according to claim 1, wherein said step of creation is performed by a user running an application of creation (Maker), in particular by using a mouse and/or a keyboard.

3. Method according to claim 2, wherein during said step of creation a user creates a drawing/grapheme by clicking the mouse, every mouse click corresponding to a knot point.

4. Method according to claim 3, wherein after each mouse click said application stores in a buffer the width (W) and the height (H) of the smallest rectangle containing all the clicked knot points until that moment, storing in said buffer the coordinates of those knot points normalized between 0 and 1.

5. Method according to claim 4, wherein said coordinates of said knot points, after having been normalized and stored, are interpolated by means of predetermined algorithms and normalized to said rectangle, showing an interpolated line.

6. Method according to claim 1, wherein said knot points can be moved by dragging them, in particular with the mouse or a keyboard, or can be eliminated, and new knot points can be inserted between existing knot points.

7. Method according to claim 1, wherein said step of generation of an output is performed by a user running an application of output generation (Player) which generates on a screen an output of said virtual pen writing said drawing/grapheme.

8. Method according to claim 7, wherein said application of creation (Maker) associates to a first and a last knot point a parameter which is stored, selected among a first and a second parameter, said trajectory interpolating the knot points being written by said virtual pen by means of said application of output generation (Player) in a direction going from the first knot point towards the last knot point if the first knot point is associated to the first parameter and the last knot point is associated to the second parameter, or in the opposite direction if the first knot point is associated to the second parameter and the last knot point is associated to the first parameter.

9. Method to produce on a screen an output according to claim 7, wherein said application of creation (Maker) associates to every knot point a parameter which is stored, said parameter selected from the group comprised of:

a parameter of interpolation curve type, associated to known interpolating algorithms, said application of output generation (Player) writing an interpolating curve starting from said knot point according to a selected interpolating algorithm corresponding to said parameter;

a parameter of pause, said virtual pen by means of said application of output generation (Player) stopping on said knot point for a time corresponding to said pause;

a parameter of "down" and a parameter of "up", said application of output generation (Player) showing said virtual pen in said down status and making said virtual pen write the piece of interpolated line starting from that knot point to the next one if to that knot point is associated the parameter of "down", or showing said virtual pen in said up status and making said virtual pen move along said piece of interpolated line without writing anything if to that knot point is associated the parameter of "up";

a parameter of speed, said application of output generation (Player) making said virtual pen write or move along the piece of interpolated line starting from that knot point to the next one at a speed which varies in a proportional way to the parameter of speed associated to those two knot points;

a parameter of thickness, said application of output generation (Player) making said virtual pen write the piece of interpolated line starting from that knot point to the next one with a thickness which varies in a proportional way to the parameter of thickness associated to those two knot points.

10. Method according to claim 9, wherein said application of creation (Maker), in case of creation of a series of graphemes, stores in a font-style file (Font), the graphemes of a same style, and a normalized size and position of the rectangle containing each grapheme and wherein said application of output generation (Player), in case of generation of a series of graphemes having a same style:

receives from the keyboard an input corresponding to said series of graphemes, to a font size value, and the value of thickness to write with;

reads from said font-style file (Font) said graphemes, uses the font size value to convert into screen coordinates the normalized size and position values of the rectangle of each grapheme, and uses the obtained values to convert into screen coordinates the coordinates of the knot points;

spaces two consecutive graphemes of a same word by adding to the abscissa values of the second grapheme the width in pixel of the first grapheme, plus a spacing value proportional (C1) to said font size value, plus the thickness value;

spaces two consecutive words of a same line by adding to the abscissa values of the first grapheme of the second word the width in pixel of the last grapheme of the first word, plus a spacing value proportional (C2) to said font size value, plus the thickness value;

spaces vertically the words of two consecutive lines by adding to the ordinate values of the graphemes of the second line a spacing value proportional (C3) to said font size value.

11. Method according to claim 10, wherein said application of output generation (Player), if said virtual pen has to move from a first knot point, to which a parameter of "up" is associated, towards a second knot point, to which a parameter of "down" is associated, causes said virtual pen to follow a three-dimensional trajectory, depicting said virtual pen that simulates a real pen detaching from the writing surface in said first knot point, maintaining itself detached from the writing surface when moving between said first and second knot points, and eventually landing to the writing surface when reaching the second knot point.

12. Method according to claim 11, wherein said application of output generation (Player), if said virtual pen has to move from a first knot point to which a parameter of "up" is associated towards a second knot point to which a parameter of "down" is associated, proceeds by determining the speed on the first knot point and then by interpolating the projection on the writing surface of the trajectory between said first knot point and said second knot point as a function of said speed, said trajectory taking into account said speed to create a continuity of the movement of said virtual pen from the moment it detaches from the writing surface.

13. Method according to claim 11, wherein said application of output generation (Player), if said virtual pen has to move from a first knot point to which a parameter of "up" is associated towards a second knot point to which a parameter of "down" is associated, rotates, translates and scales the image of said virtual pen between detaching from and landing again on the writing surface.

14. Method according to claim 7, wherein said application of output generation (Player), writes initially on the screen an image of the virtual pen in a location such that its tip is very close to the first knot point.

15. Method according to claim 7, wherein a parameter of joined-up writing on/off can be selected, such that, with joined-up writing on, said application of creation (Maker), after having stored the graphemes in a file, lets the user to subdivide all the knot points of each grapheme into three subsets: a subset of initial knot points, a subset of central knot points, and a subset of final knot points, and to create, for each couple of adjacent graphemes, the knot points of a line joining a central part of the first grapheme to a central part of the second grapheme, such that said application of output generation (Player), joins a determined knot point of the final knot point of central part of a preceding grapheme to a central part of a following grapheme.

\* \* \* \* \*